Aug. 2, 1955 H. HEYWANG 2,714,565

METHOD OF AND APPARATUS FOR CLEANING CAPACITOR FOILS

Filed May 11, 1954

INVENTOR
HERMANN HEYWANG.
BY
ATTORNEY

United States Patent Office 2,714,565
Patented Aug. 2, 1955

2,714,565

METHOD OF AND APPARATUS FOR CLEANING CAPACITOR FOILS

Hermann Heywang, Karlsruhe, Germany, assignor to Siemens & Halske Aktiengesellschaft, Munich, Germany, a corporation of Germany Application May 11, 1954, Serial No. 428,968

Claims priority, application Germany May 12, 1953

13 Claims. (Cl. 134—22)

Figure 1:
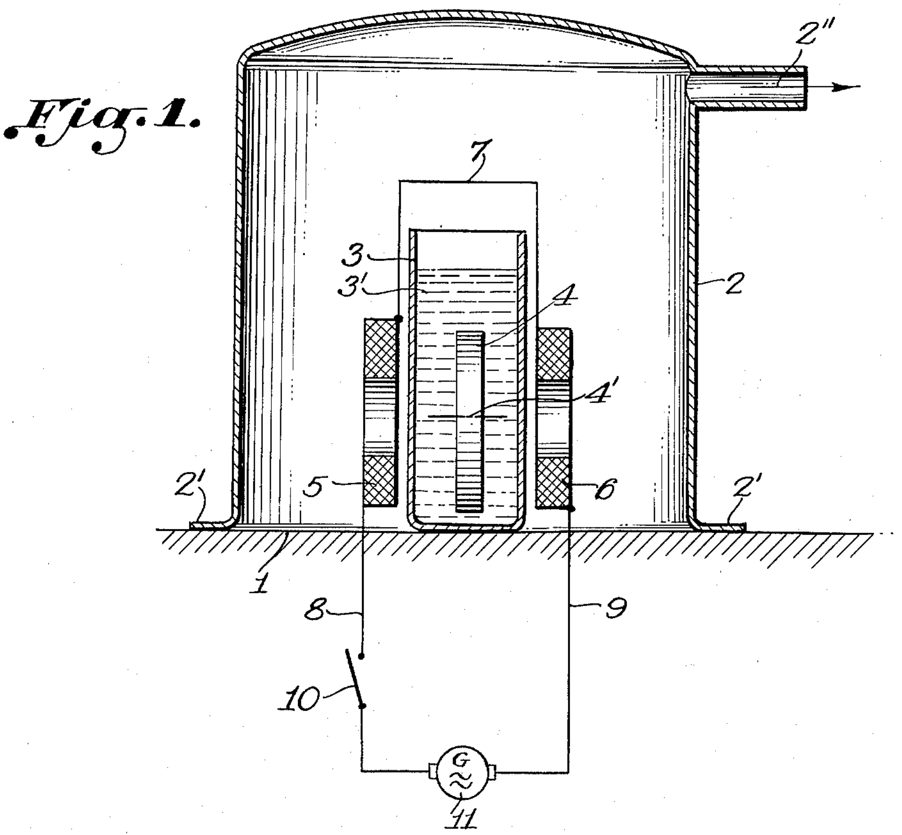

This invention relates to a method of cleaning varnished carrier foils for capacitors, for example, foils of the type produced in accordance with the method described in copending application Serial No. 213,222, filed October 20, 1950.

The method disclosed in the above noted copending application proposes to remove the marginal portions of a metallic carrier which had been provided on both sides with dielectric layers, for example, by chemically acting means or by corrosive etching, thereby producing relatively wide dielectric margins extending laterally from the carrier edges to facilitate the contacting of the second coating on the foil at the edges thereof. Experiments have shown that it is necessary to remove contamination and etching residue from the space between the laterally extending marginal portions of the dielectric. If the foils are not sufficiently cleaned, the capacitors made therefrom will not exhibit sufficient breakdown resistance.

The cleaning is in accordance with the invention accomplished by taking the foil which had been marginally corrosively etched as indicated above and immersing it in a boiling cleaning fluid, especially in distilled water to which may be added cleaning substances such as amyl alcohol which reduces the surface tension. The boiling of the cleaning fluid may be accomplished by heating and/or in partial vacuum. Vapor bubbles are produced, incident to such boiling, between the marginal portions of the dielectric layers which extend laterally from the edge or edges of the carrier foil, causing the cleaning fluid to act turbulently within and between such marginal portions and the space therebetween is thus thoroughly washed and cleaned.

It is in such cleaning above all important to affect the space between the dielectric portions extending edgewise from the metallic carrier, and the invention, in accordance with a feature thereof, therefore takes care of increasing the amount thereof within such space. This object is accomplished by heating the metallic carrier foil electrically either alone or in conjunction with the heating of the vessel containing the cleaning fluid. The carrier foil may be heated during the cleaning by conducting through it a current of sufficient strength; but it is particularly suitable to heat the coil by high frequency current and preferably inductively. The eddy currents thus inductively produced in the foil heat it to such an extent that the cleaning fluid in the space between the marginally extending portions of the dielectric is brought to boil primarily along the edge of the foil, that is, along the bottom of the space to be cleaned.

The use of a partial vacuum has been found particularly favorable in cases where the dielectric layers are made of synthetic varnish which is sensitive to temperature. It must be considered in this connection that the effect of the cleaning procedure depends essentially on the mechanical turbulence of the cleaning fluid in accordance with the steam or vapor volume produced upon boiling within the space to be cleaned. The steam or vapor volume increases at a given amount of steam with falling pressure thereof. The use of a partial vacuum therefore lowers the energy requirements for the production of the necessary steam volume. The temperature required for producing the steam is in addition very much reduced so that it will not be harmful even to dielectric varnish layers which are very sensitive to steam or vapor.

The cleaning effect of the method according to the invention is sufficient for the cleaning of foils moving through the cleaning fluid as well as for the cleaning of wrapped foils in a stationary bath. Particular advantages result in the latter case because heat is given off from the wrapped foil dipped into the bath, at the ends thereof, that is, exactly at the places where the cleaning should occur.

Details of the method according to the invention will be explained with reference to an example thereof which is illustrated in the accompanying drawings. In these drawings, Fig. 1 indicates in schematic manner means for carrying out the cleaning of a wrapped foil in a stationary bath; and Fig. 2 shows a greatly enlarged cross-sectional view of the foil that may be coiled to form a wrap.

Referring now to the drawings, numeral 1 in Fig. 1 indicates a support for the flanges 2' of a vacuum bell 2 having the nipple 2'' which may be connected with a suitable suction pump. The pressure within the bell 2 is held at a point less than one atmosphere. Within the vacuum bell is disposed a cleaning vessel 3 containing cleaning fluid 3'. A wrapped foil 4 of the type described before is placed into the cleaning fluid. The axis of the wrapped foil is indicated by the dot-dash line 4'. This wrapped foil is heated inductively by means of two coils 5, 6, which are energized by a median frequency from the generator or source 11 over a series circuit including the conductors 7, 8, 9 and the switch 10. The coils 5 and 6 are wound in identical magnetic sense. The current delivered by the source 11 therefore produces a median frequency magnetic field which passes through the wrapped foil 4.

The eddy currents which are thereby produced heat the metallic parts of the wrapped foil 4 so that steam bubbles are produced in the gap or space between the portions of the dielectric varnish layers extending laterally edgewise from the metallic carrier foil.

Figure 2:
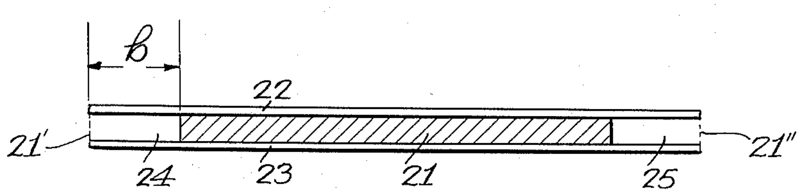

Referring to the cross-sectional view shown in Fig. 2, numeral 21 indicates the metallic carrier foil on which are disposed the varnish layers 22, 23. The metallic carrier foil 21 extended originally to the outer edges of the varnish layers 22, 23, as indicated by the dotted lines 21' and 21''. By the method according to the previously mentioned copending application, portions of the carrier foil 21 are removed by corrosive etching to a certain depth so as to produce the gaps or spaces 24 and 25 which are free of metal. As may be seen from Fig. 2, the result is, that portions of the dielectric layers 22 and 23 extend marginally considerably beyond the inner edges of the metallic carrier foil.

The metallic carrier foil 21 is generally only a few $\mu$ thick, about $6\mu$, and the depth or width of the spaces 24 and 25, indicated in Fig. 2 by "$b$" is at least 1 mm. or more. The ratio of the two edges of the cross-sectional areas of the spaces 24 and 25 therefore is in the neighborhood of 20 to 50. It will be apparent that the cleaning of the free spaces 24, 25 is extraordinarily difficult when considering that the metallic carrier foil 21 is very thin as compared with the relatively great depth of the free spaces. The dimensions noted will give an idea of the difficulties.

The method disclosed herein is of course also applicable in the cleaning of foils, such as described in the copending application, in which the metallic carrier is by corrosive etching removed only at one marginal edge thereof.

The previously described stationary cleaning of foils in wrapped form has proved very satisfactory. Experiments have however shown that the subsequent drying is preferably effected with the foil moving in unwrapped condition which is particularly true in the case of foils having dielectric varnish layers 22, 23 as shown in Fig. 2. The reason resides in the fact that a wrapped foil such as 4 in Fig. 1 acquires during the cleaning a considerable amount of cleaning fluid which can evaporate from the wrap only relatively slowly even if the wrap is placed in a vacuum. The drying of the foil by moving it is considerably quicker, cheaper and more favorable in spite of the additional expenditure required therefor. It is accordingly recommended that the wrapped foil be unwrapped after the stationary cleaning and that it be moved through a drying cycle in contact with air and thereafter wrapped again for storage before vaporizing thereon the second coating.

What is believed new and desired to have protected by Letters Patent is defined in the appended claims.

I claim:

1. The method of cleaning capacitor foils of the type comprising a striplike metallic member carrying on both sides thereof dielectric layers which extend laterally marginally beyond the metallic member at least along one edge thereof to form along such edge a vacant space extending between said layers comprising the following steps, namely, immersing the foil to be cleaned in a cleaning fluid, and causing the cleaning fluid within said marginal vacant space to boil.

2. The method according to claim 1, comprising the step of electrically heating said metallic member to cause said heating fluid to boil.

3. The method according to claim 2, wherein said metallic member is heated inductively by alternating current.

4. The method according to claim 1, wherein said foil is stationary during the cleaning thereof.

5. The method according to claim 1, wherein said foil is immersed in a cleaning fluid in the form of a wrapped package, comprising the steps of thereafter unwrapping said foil, and moving the unwrapped foil exposed to air to dry it.

6. The method according to claim 1, wherein said foil is cleaned in wrapped condition thereof.

7. The method according to claim 1, wherein said cleaning fluid comprises distilled water.

8. The method according to claim 1, wherein said cleaning fluid comprises distilled water, and an agent which reduces the surface tension thereof.

9. The method according to claim 1, comprising the step of applying a partial vacuum to cause the boiling of said cleaning fluid.

10. The method according to claim 1, comprising the steps of heating said cleaning fluid and separately electrically heating said metallic member to intensify production of steam within said marginal vacant space so as to facilitate cleaning thereof.

11. The method of cleaning capacitor foils of the type comprising a striplike metallic member carrying on both sides thereof dielectric layers which extend laterally marginally beyond the metallic member at least along one edge thereof to form along such edge a vacant space extending between said layers comprising the following steps, namely, wrapping the foil to be cleaned to form a compact body, immersing said body in a suitable cleaning fluid, and applying an alternating current magnetic field to said fluid so as to cause heating of said fluid and inductive heating of the metallic member of said foil for the purpose of bringing about boiling of said fluid primarily within such vacant space, the turbulence set up by said boiling fluid facilitating the cleaning of said vacant space and adjacent parts of said foil.

12. The method according to claim 11, comprising the step of applying a partial vacuum to facilitate the boiling of said cleaning fluid.

13. The method according to claim 12, wherein said cleaning fluid is distilled water comprising an agent which reduces the surface tension thereof.

References Cited in the file of this patent

UNITED STATES PATENTS

| | | |
|---|---|---|
| 1,328,657 | Fish | Jan. 20, 1920 |
| 2,527,666 | Winter | Oct. 31, 1950 |